United States Patent
Hasan et al.

(10) Patent No.: US 10,214,079 B2
(45) Date of Patent: Feb. 26, 2019

(54) VEHICULAR AIR FILTER PROVIDING HIGH EFFICIENCY PARTICLE AND GAS FILTRATION

(71) Applicant: CARL FREUDENBEG KG, Weinheim (DE)

(72) Inventors: Katherine Hasan, Hopkinsville, KY (US); Volker Haendler, Hopkinsville, KY (US); Oliver Staudenmayer, Hopkinsville, KY (US); Saru Dawar, Hopkinsville, KY (US)

(73) Assignee: CARL FREUDENBERG KG, Weinheim (DE)

( * ) Notice: Subject to any disclaimer, the term of this patent is extended or adjusted under 35 U.S.C. 154(b) by 0 days.

(21) Appl. No.: 15/280,688

(22) Filed: Sep. 29, 2016

(65) Prior Publication Data

US 2017/0189847 A1    Jul. 6, 2017

Related U.S. Application Data

(60) Provisional application No. 62/273,016, filed on Dec. 30, 2015.

(51) Int. Cl.
| | |
|---|---|
| *B01D 53/02* | (2006.01) |
| *B60H 3/06* | (2006.01) |
| *B01D 39/20* | (2006.01) |
| *B01D 46/54* | (2006.01) |
| *B01D 53/04* | (2006.01) |
| *B01D 39/16* | (2006.01) |
| *B01D 46/00* | (2006.01) |

(52) U.S. Cl.
CPC ........... *B60H 3/06* (2013.01); *B01D 39/1623* (2013.01); *B01D 39/1692* (2013.01); *B01D 39/2017* (2013.01); *B01D 39/2055* (2013.01); *B01D 46/543* (2013.01); *B01D 53/04* (2013.01); *B01D 53/0407* (2013.01); *B01D 46/0036* (2013.01); *B01D 2239/065* (2013.01); *B01D 2239/0654* (2013.01); *B01D 2239/1233* (2013.01); *B01D 2253/102* (2013.01); *B01D 2257/106* (2013.01); *B01D 2257/302* (2013.01); *B01D 2257/306* (2013.01); *B01D 2257/404* (2013.01); *B01D 2257/406* (2013.01); *B01D 2257/708* (2013.01); *B01D 2257/7022* (2013.01); *B01D 2257/7027* (2013.01); *B01D 2258/06* (2013.01); *B01D 2259/4566* (2013.01); *B60H 2003/0691* (2013.01)

(58) Field of Classification Search
CPC ................ B01D 46/522; B01D 46/543; B01D 39/2017; B01D 53/04; B01D 2253/102
See application file for complete search history.

(56) References Cited

U.S. PATENT DOCUMENTS

| | | | |
|---|---|---|---|
| 6,273,938 B1 * | 8/2001 | Fanselow | B01D 39/1623 55/497 |
| 9,199,189 B1 * | 12/2015 | Ptak | B01D 53/0407 |
| 2010/0212506 A1 * | 8/2010 | Togashi | B01D 39/1623 96/154 |
| 2014/0130469 A1 | 5/2014 | Nagy et al. | |

* cited by examiner

*Primary Examiner* — Christopher P Jones
(74) *Attorney, Agent, or Firm* — Grossman, Tucker, Perreault & Pfleger, PLLC

(57) ABSTRACT

The present disclosure is directed at a vehicular air filter with relatively high efficiency particle arresting performance along with removal of volatile organic and/or inorganic contaminants. The filter is particularly suitable for hybrid type vehicles.

12 Claims, 7 Drawing Sheets

US 10,214,079 B2

VEHICULAR AIR FILTER PROVIDING HIGH EFFICIENCY PARTICLE AND GAS FILTRATION

CROSS REFERENCE TO RELATED APPLICATIONS

This application claims the benefit of U.S. Provisional Patent Application Ser. No. 62/273,016 filed Dec. 30, 2015, which is fully incorporated herein by reference.

FIELD

The present disclosure relates to a vehicular air filter. More specifically, the air filter herein provides vehicular occupants with high-efficiency particle arresting (HEPA) performance along with the removal of organic and/or inorganic gas contaminants. The filter is particularly suitable for hybrid type vehicles.

BACKGROUND

The quality of air flow within a vehicle is clearly an important consideration with respect to the health and comfort of the occupants. As may be appreciated, air pollution within the vehicle may be the result of atmospheric pollution and solid particulate that may accumulate on roadways. In addition, vehicular air pollution can be the direct result of the volatile organic and/or inorganic contaminants that are associated with vehicle operation such as vehicle exhaust that can concentrate in relatively high density traffic locations. In addition, environmental pollution in the form of volatile organic compounds has become a growing concern.

With regards to vehicular air filtration, one long-standing issue is that with respect to air filtration, the size and configurations available in the engine compartment impacts the size and configuration of the air filter. In that sense, air filtration is often times limited to a relatively compact design requirements, which in turn can lead to reduced efficiency in air filtration and the ability to provide the occupants with a cabin air environment that is more comfortable and relatively free of airborne contaminants.

Furthermore, due to the increasing air pollution, increasingly more pollutants are present in the environment of a motor vehicle so the motor vehicle cabin filter is exposed to a higher concentration of contaminants. These pollutants can be, for example, dust and soot particles as well as pollen, bacterial spores and fungal spores, bacteria and fungi. Some metabolic products of the microorganisms are known to constitute allergic substances for the human respiratory system. In some individuals, they can cause asthma attacks and possibly an immunological defense reaction.

In addition, while the efficiency of filters depends in particular on the surface area of the filter that is exposed to air flow, for motor vehicle cabin filters primarily zigzag-shaped folded filter media are used that are also often referred to as pleated filter media. In this way, due to the folding of the employed filter medium, depending on the height of the folds and the fold spacing of the various fold sections of the filter medium, an effective enlargement of the filter surface area flowed through by the air flow can be provided. However, as noted, given issues with available spacing in fossil fuel type engines, the use of pleated filters of relatively restricted size has still limited the ultimate efficiency that may be provided to vehicle occupants.

SUMMARY

A vehicular air filter comprising: particle filtering media containing a glass fiber backing layer or synthetic fiber backing layer having a basis weight of 50 g/m² to 150 g/m² including a polymeric membrane layer, wherein the particle filtering media provides a removal efficiency of 99.5% or greater of particles having a diameter of 0.3 microns or greater. The filter includes a volatile compound filtration layer comprising an activated carbon layer having a basis weight of 180 g/m² to 320 g/m² on a polymeric support layer, wherein the activated carbon layer reduces incoming levels of one or more volatile organic or inorganic compounds. The vehicle air filter provides a surface area for air filtration of 2.0 m² to 4.0 m²

DETAILED DESCRIPTION

Figure 1:
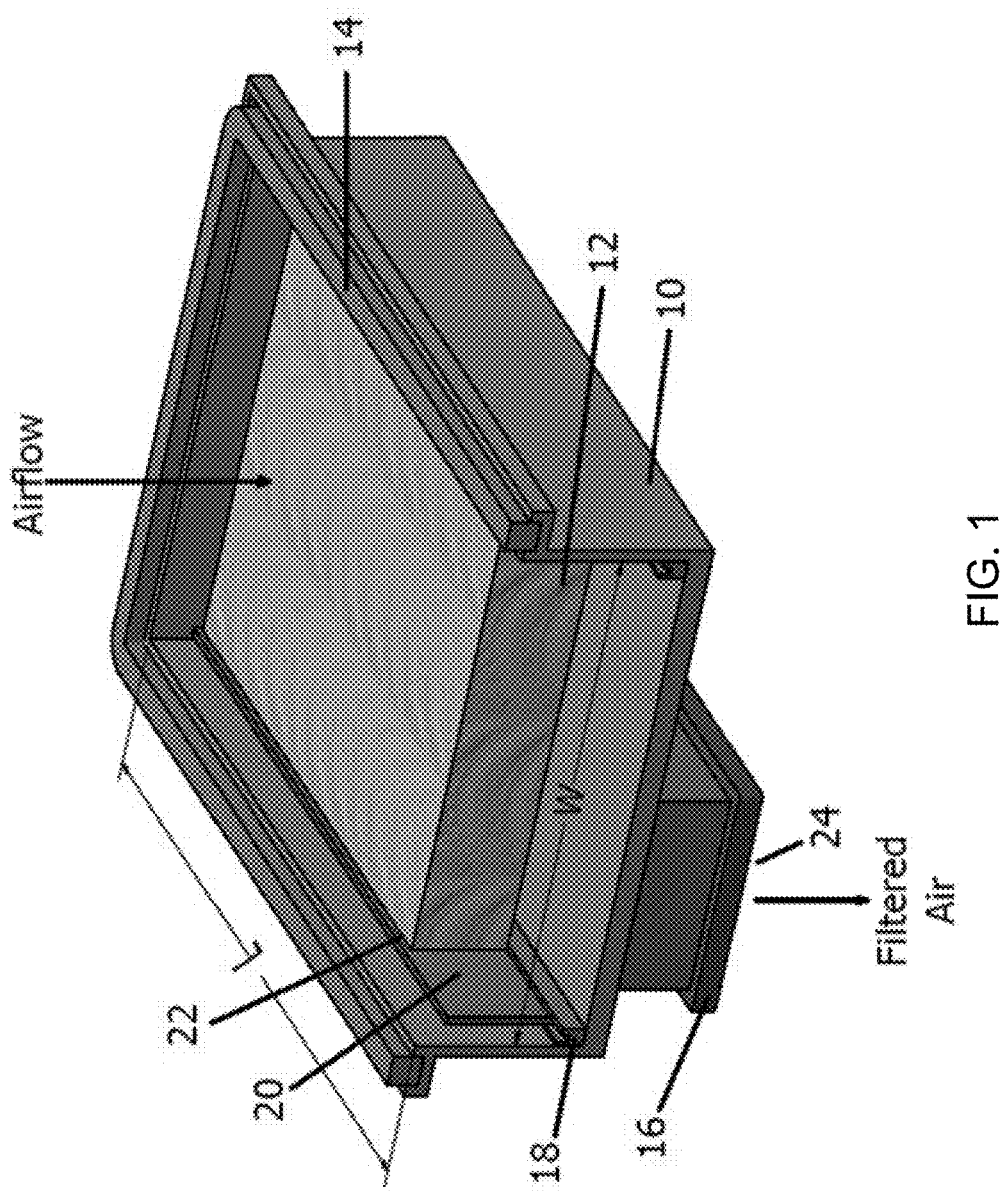
FIG. 1 is a general perspective view of the filter configuration that may be employed herein.

FIG. 1 provides a general perspective view of the filter configuration that may be employed herein. As can be seen, the filter includes at 10 an injection molded frame, which can be produced from a thermoplastic resin, one of which is preferably acrylonitrile-butadiene-styrene (ABS). Illustrated at 12 is the preferred multi-layer filter pleat pack, which is described in more detail herein. At 14 is the upstream gasket, at 16 is a downstream gasket, which is preferably made of closed cell neoprene, at 18 is a sealing material, at 20 is one edgeband material and at 22 is hot melt adhesive to secure the edgeband to the filter pleat pack. In the broad context of the present invention, the length of the injection molding housing, the direction indicated by arrow L, may be in the range of 500 mm to 1500 mm, preferably 700 mm to 1200 mm, more preferably, 750 mm to 1110 mm. Note that in FIG. 1 the front of the housing is missing to provide the perspective view, so that the length includes the missing portion.

The width of the injection molding housing, as indicated by arrow W, may fall in the range of 300 mm to 500 mm, more preferably 350 mm to 450 mm, and most preferably, 400 mm to 450 mm. The injection molded downstream outlet duct shown at 24 may have an opening defined by a length and width where the length falls in the range of 150 mm to 300 mm, more preferably 200 mm to 300 mm, and the width falls in the range of 50 mm to 150 mm, more preferably 75 mm to 125 mm. One particularly preferred embodiment includes an outlet duct having a length of about 240 mm and a width of about 95 mm.

Figure 2:
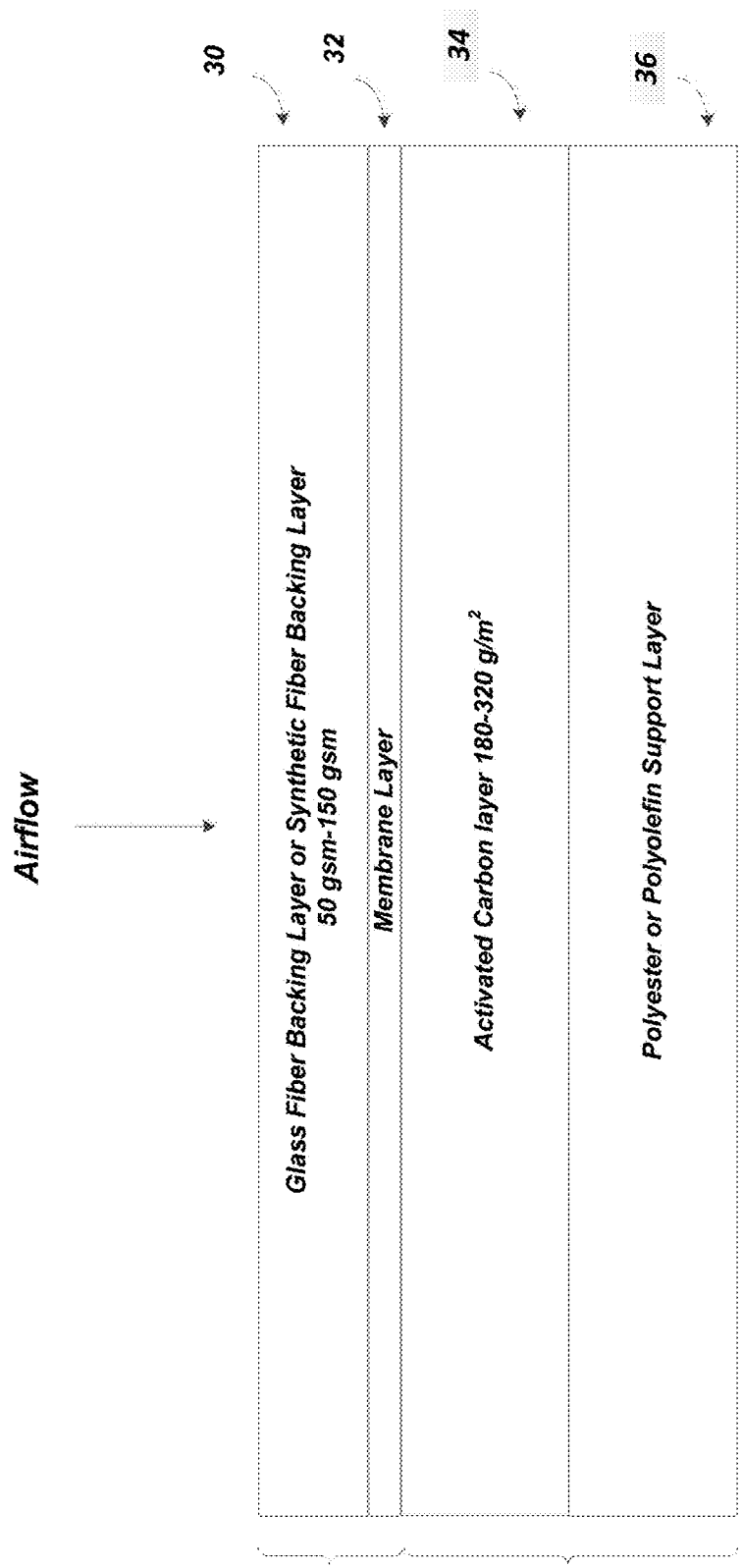
FIG. 2 illustrates one preferred layering configuration of the filter pack herein.

FIG. 2 illustrates one preferred layering configuration for the filter herein. As can be seen, the filter media itself preferably comprises either a glass fiber backing layer or synthetic fiber backing layer 30 in combination with a polymeric type membrane layer 32. The layer 30 may be preferably sourced from nonwoven fibers and continuous long fibers, but not staple fibers. The fibers may have diameters in the range of 15 μm to 40 μm, preferably 20 μm to 30 μm. The synthetic fibers may be selected from polyesters or polyolefines such as PET or polypropylene. The backing layer 30 may have a basis weight in the range of 50 $g/m^2$ to 150 $g/m^2$.

The membrane layer 32 is preferably polymeric, such as a polyolefin, polyamide or fluropolymer. The polyolefin may preferably be polyethylene and the fluropolymer (polymer containing one or more C—F bonds) such as polytetrafluroethylene. The membrane layer preferably has a basis weight of 10 $g/m^2$ to 30 $g/m^2$, more preferably 15 $g/m^2$ to 25 $g/m^2$, and in one preferred embodiment a basis weight of 20 $g/m^2$.

The preferred overall thickness of layer 30 (the glass fiber backing layer and/or synthetic fiber backing layer) and 32 (the membrane layer) is in the range of 0.30 mm to 0.60 mm, more preferably, 0.40 mm to 0.50 mm. The membrane layer 32 may itself have a thickness in the range of 100 μm to 150 μm, preferably in the range of 125 μm to 135 μm.

The glass fiber or synthetic fiber backing layer together with the preferred polyethylene based membrane preferably has a 0.3 μm removal efficiency at a flow rate of 5.3 cm/s of 99.5% or greater, e.g. 99.6%, 99.7%, 99.8%, and more particularly, up to a level of 99.96%. The test is performed for 150 mm diameter sample size at 21.6° C., 45% Relative Humidity, 983 mbar ambient pressure with aerosol size distribution of 500 nm to 5 microns. Accordingly, the removal efficiency herein of 0.3 μm diameter or greater sized particles may be in the range of equal to or greater than 99.5% up to a level of 99.96%. In one preferred configuration one can utilize a glass fiber backing layer with a polyethylene membrane layer where the basis weight of the glass fiber filter media is preferably be 56.6 $g/m^2$. Another preferred backing layer/membrane combination includes a polyester spun bond backing layer at a basis weight of 65/$g/m^2$ with a polyethylene membrane layer at a basis weight of 20 $g/m^2$.

Figure 3:
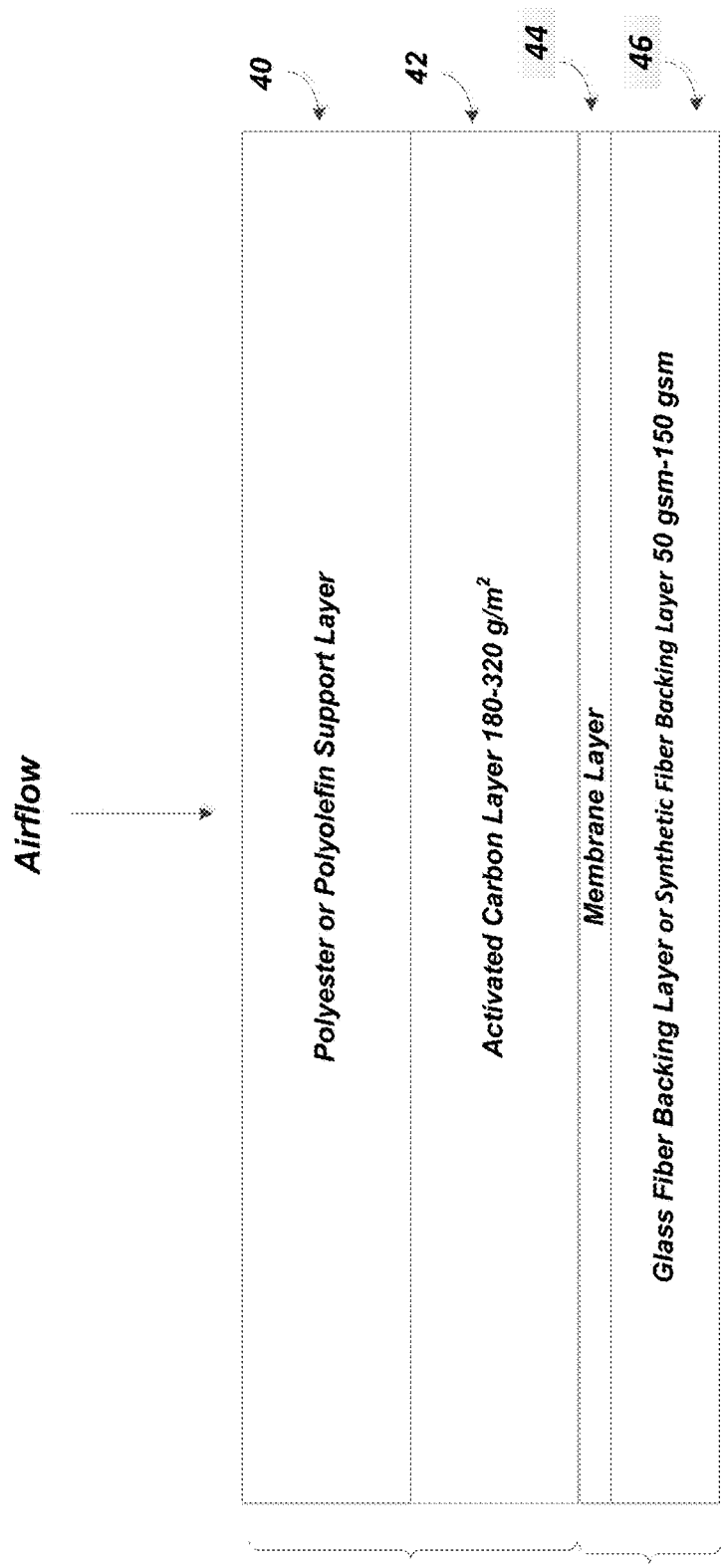
FIG. 3 illustrated another preferred layering configuration of the filter pack herein.

The layering configuration in FIG. 3 also includes an activated carbon layer 34, which preferably contains activated carbon granules having a basis weight of 180 $g/m^2$ to 320 $g/m^2$ and more preferably a basis weight of 250 $g/m^2$ at a variation of +/−10% (i.e. at a level of 225 $g/m^2$ to 275 $g/m^2$). Activated carbon is reference to carbon that is capable of removing volatile compounds, as described more fully herein. The activated carbon granules are present on a polymeric support layer, preferably a polyester or polyolefin support layer 36. The thickness of the activated carbon layer 34 together with the polyester or polyolefin support layer 36 is preferably in the range of 0.75 mm to 2.0 mm. In one preferred embodiment the thickness of the activated carbon layer 34 and support layer 36 falls in the range of 1.0 mm to 2.0 mm, most preferably having a value in the range of 1.1 mm to 1.8 mm. The polyester support layer itself may have a thickness in the range of 0.4 mm to 0.5 mm.

Preferably, the activated carbon layer contains different blended activated carbons. This is achieved by blending carbon at a 125 $g/m^2$ basis weight which may be targeted for aldehyde removal and-carbon at 125 $g/m^2$ basis weight, which is targeted for removal of $H_2S$, $SO_2$ and $NO_2$. The activated carbon so provided also preferably includes polyolefin binder filaments with fiber diameters of about 15 μm where the binder filaments are present at a level of about 10-20% based upon the weight of the carbon present.

With regards to FIG. 2, it is noted that preferably, there is a relatively small amount (e.g. 5 $g/m^2$ to 20 $g/m^2$) of an adhesive present as between the backing layer 30 and membrane layer 32, as well as a small amount of adhesive present on the support layer 36 to assist in immobilizing the carbon granules in the carbon granule layer 34. In addition, it is noted that preferably, backing layer 30 and membrane layer 32 are physically adhered to the support layer containing the activated carbon layer, during the pleating process.

FIG. 3 illustrates another preferred filter configuration for use in the present disclosure. The components are preferably the same as above, but as can be seen, the airflow direction is different. As can therefore be seen, in this configuration, the air flow is such that it initially passes through the polyester or polyolefin support layer 40, then the activated carbon layer 42, then through the membrane layer 44 and then through the glass fiber layer or synthetic fiber backing layer 46.

The activated carbon layer is again preferably sourced from activated carbon granules having a basis weight as recited above for the embodiment described in FIG. 2. The thickness of support layer 40 and activated carbon layer 42 is also the same as recited above in connection with FIG. 2. However, in this particular configuration, the thickness of the support layer 40 and activated carbon layer is preferably in the range of 1.5 mm to 2.0 mm. The membrane layer 44 and glass fiber or synthetic backing layer 46 again preferably have a thickness of 0.30 mm to 0.60 mm, more preferably, 0.40 mm to 0.50 mm.

The filter media in either FIG. 2 or FIG. 3 is then preferably converted into a pleated filter configuration, where the distance between the peaks of the pleats falls in the range of 4.0 mm to 8.0 mm, more preferably in the range of 6.0 mm to 7.0 mm. In that regard, the filter media having a distance between pleats of 6.0 mm, and having a preferred length of 1020 mm and a preferred width of 310 mm, now provides an available surface area for filtration in the vehicle of 3.0 $m^2$. When the distance between the pleats is 7.0 mm, the available surface area for filtration in the vehicle, for a filter having a length of 1022 mm and a width of 310 mm is 2.6 $m^2$. Accordingly, with respect to the filter media herein, it may have a length in the range of 650 mm to 1100 mm, and a width in the range of 300 mm to 400 mm.

Accordingly, in the broad context of the present disclosure, the surface area for air filtration of the filter, which provides both particle filtration and removal of volatile organic or inorganic compounds, is at least 2.0 $m^2$ and in the range of 2.0 $m^2$ to 4.0 $m^2$. Reference to volatile organic or inorganic compounds is understood herein as a compound having a boiling point of less than or equal to 250° C. measured at atmospheric pressure of 101.3 kPa. Such volatile organic or inorganic compounds may therefore include compounds that relatively easily become a vapor or gas, i.e. such compounds are volatile enough to evaporate from material surfaces at ambient conditions.

With reference back to FIG. 1, edgeband 20, which can have a thickness of about 1.5 mm, is preferably selected to provide rigidity to the filter pleat pack, and is preferably selected from a polyester having a basis weight in the range of 200 $g/m^2$ to 300 $m^2$ and having a thickness of 0.40 mm to 0.60 mm, preferably 0.52 mm thickness. It is noted that a hot melt adhesive 22 is preferably utilized to adhere edgeband 20 to the edgeband and it is preferably selected from polyolefin type resins, such as ethylene-vinyl acetate resin, having a density of 0.96 g/cc and a softening point of 186° F. In addition, it is contemplated that the hot melt adhesive 22 may be selected from a polypropylene resin, having a density of 0.98 g/cc and a softening point of 155°

C. to 170° C. In total, the amount of hot melt adhesive that is employed falls in the range of above 75 grams to 150 grams, more preferably 90 grams to 130 grams.

In addition, a hot melt adhesive may be utilized to seal the filter pack 12 to the injection molded plastic housing. Such hot melt is preferably an amorphous poly-alpha-olefin (APAO). A particular preferred APAO for use herein has a density of 0.93 g/cc (+/−0.1 g/cc) and provides a static adhesion failure temperature of 190° F. to 240° F. The total amount employed falls in the range of 70 grams to 175 grams. Another preferred hot melt adhesive has a specific gravity of 0.980 and a softening point of 230° F.

The filter media from FIG. 2 and FIG. 3 are preferably converted into filter pleat packs by processing 60 to 100 pleats per minute, more preferably 80 pleats/min. The folds are stabilized by heat at 100° C. and then cut into bundles of filters and adding edgebanding.

As may now be appreciated, the filter pack herein (FIG. 2) containing the glass or synthetic fiber backing layer 30 in combination with membrane layer 32 as well as the filter pack herein (FIG. 3) containing a similar backing layer 48 and membrane layer 46, results in the ability to provide particle filtration, namely the ability to provide removal efficiencies of up to 99.97% of particles that have a size of 0.3 microns or greater. In addition, the filter pack herein illustrated in FIG. 2 or FIG. 3 is one that is able to achieve aspects of the required efficiencies according to European Union Standard (EN1822:2009).

In addition, with regards to the presence of the carbon granules, the filter pack herein is one that is particularly suitable for the removal of volatile organic or inorganic compounds, including but not limited to removal of one or more of NOx ($NO+NO_2$), $SO_2$, $O_3$, $H_2S$, $CH_2O$, $NH_3$, $CH_3SH$ and various hydrocarbons. Such hydrocarbons include cyclohexane ($C_6H_{12}$), benzene ($C_6H_6$), toluene ($C_7H_8$) and xylenes ($C_8H_{10}$). Accordingly, in preferred embodiment, the filter pack herein may efficiently remove all of these identified volatile organic or inorganic compound within the vehicle.

Figure 4:
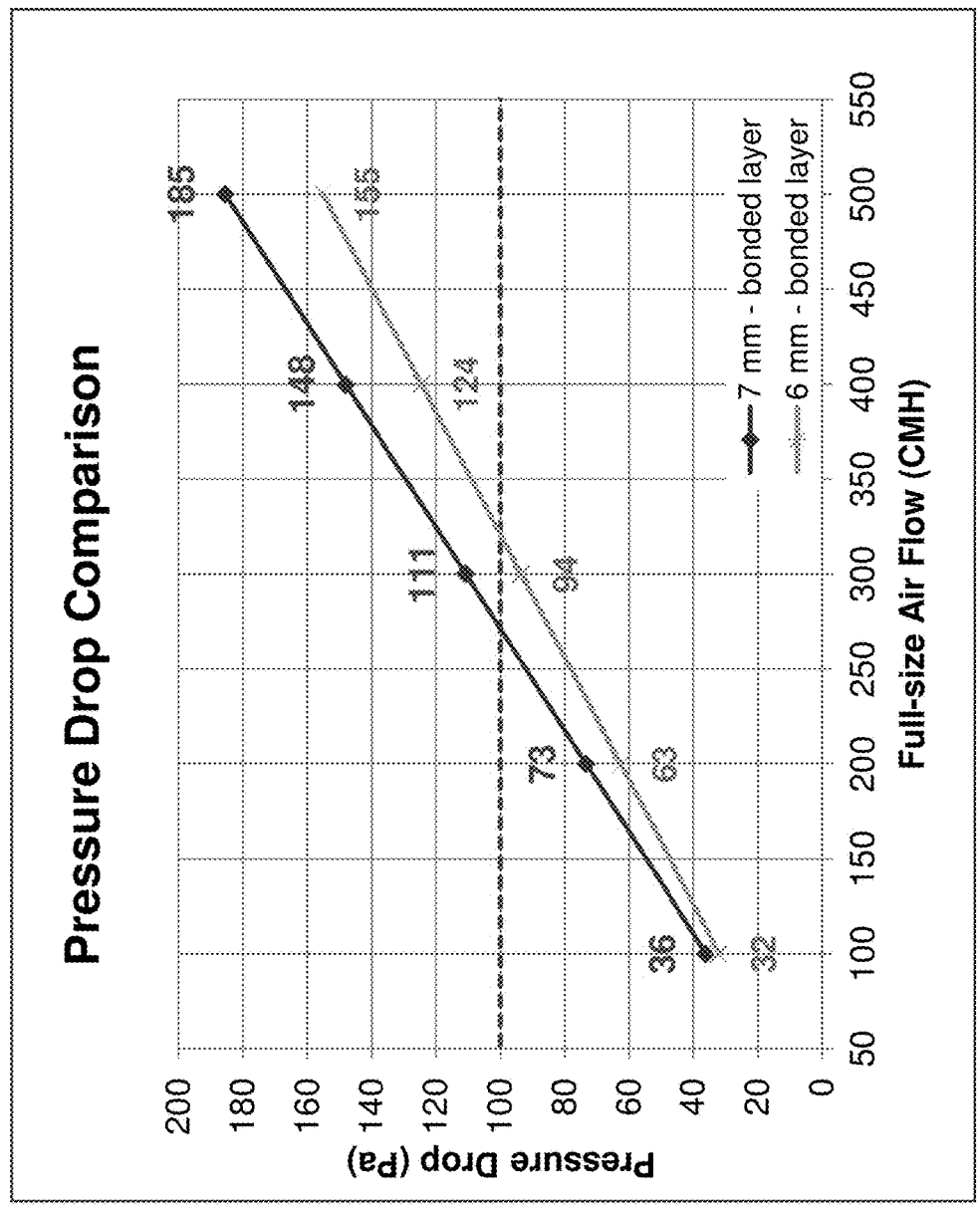
FIG. 4 illustrates the pressure drop of the pleated filter pack illustrated in FIG. 2 utilized in the filter construction shown generally in FIG. 1.

FIG. 4 next illustrates the pressure drop of the pleated filter pack illustrated in FIG. 2 that is contemplated for use in the filter construction shown generally in FIG. 1. As can be seen, for the pleated construction where the distance between the apex of the pleats is 7 mm, at 200 cubic meters/hour (CMH), the pressure drop is expected to be 73 Pa. For a pleated construction where the distance between the pleat apex is 6 mm, at 200 CMH, the pressure drop is expected to be 63 Pa.

Figure 5:
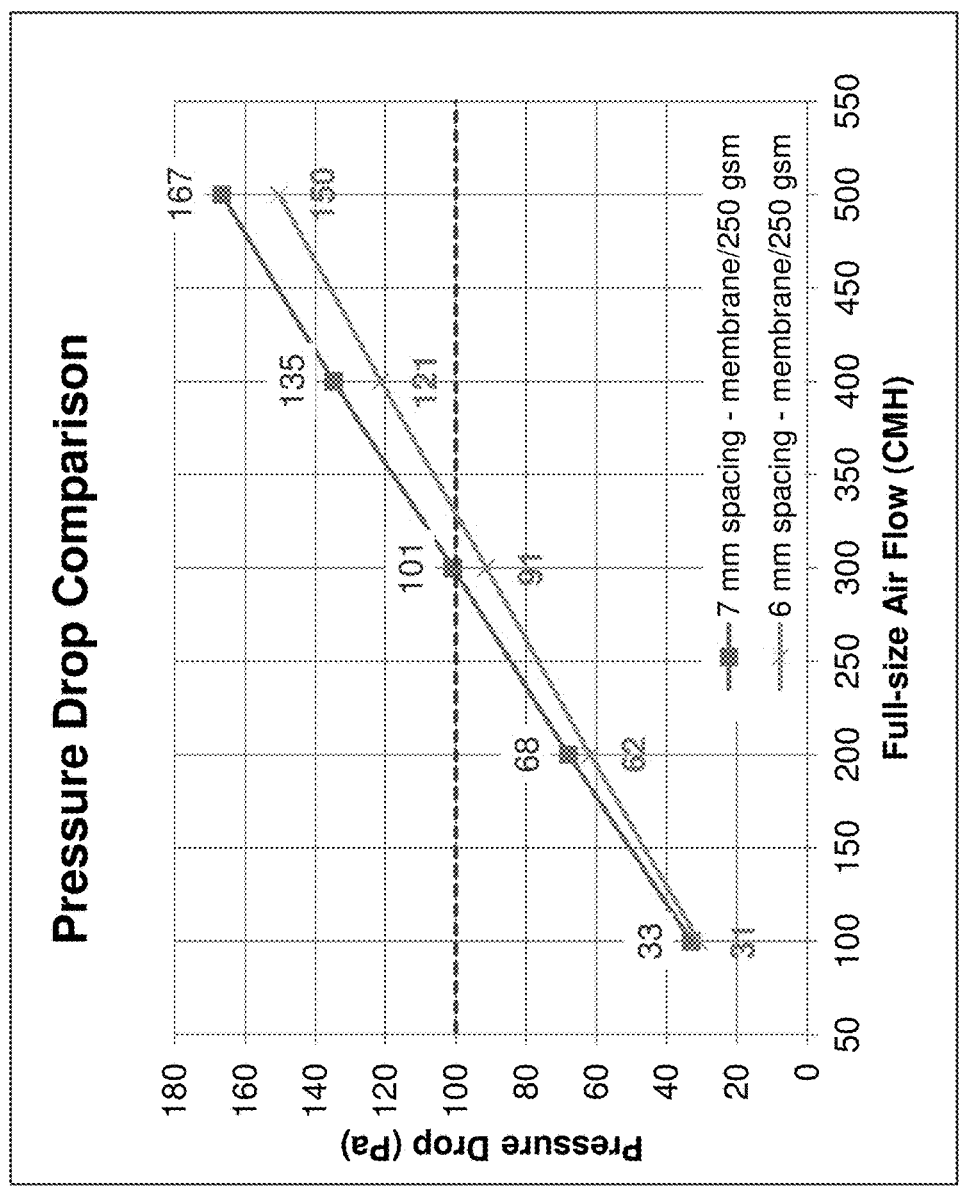
FIG. 5 illustrates the pressure drop of the pleated filter pack in FIG. 2 utilized in the filter construction shown generally in FIG. 1.

FIG. 5 next illustrates the pressure drop of the pleated filter pack of FIG. 2, contemplated for use in the filter construction shown generally in FIG. 1. As can be seen, for the pleated construction where the distance between the apex of the pleats is 7 mm, at 200 cubic meters/hour (CMH), the pressure drop is 68 Pa where the carbon layer is at 250 g/m². For a pleated construction where the distance between the pleat apex is 6 mm, at 200 CMH, the pressure drop is 62 Pa where the carbon layer is again at 250 g/m².

Figure 6:
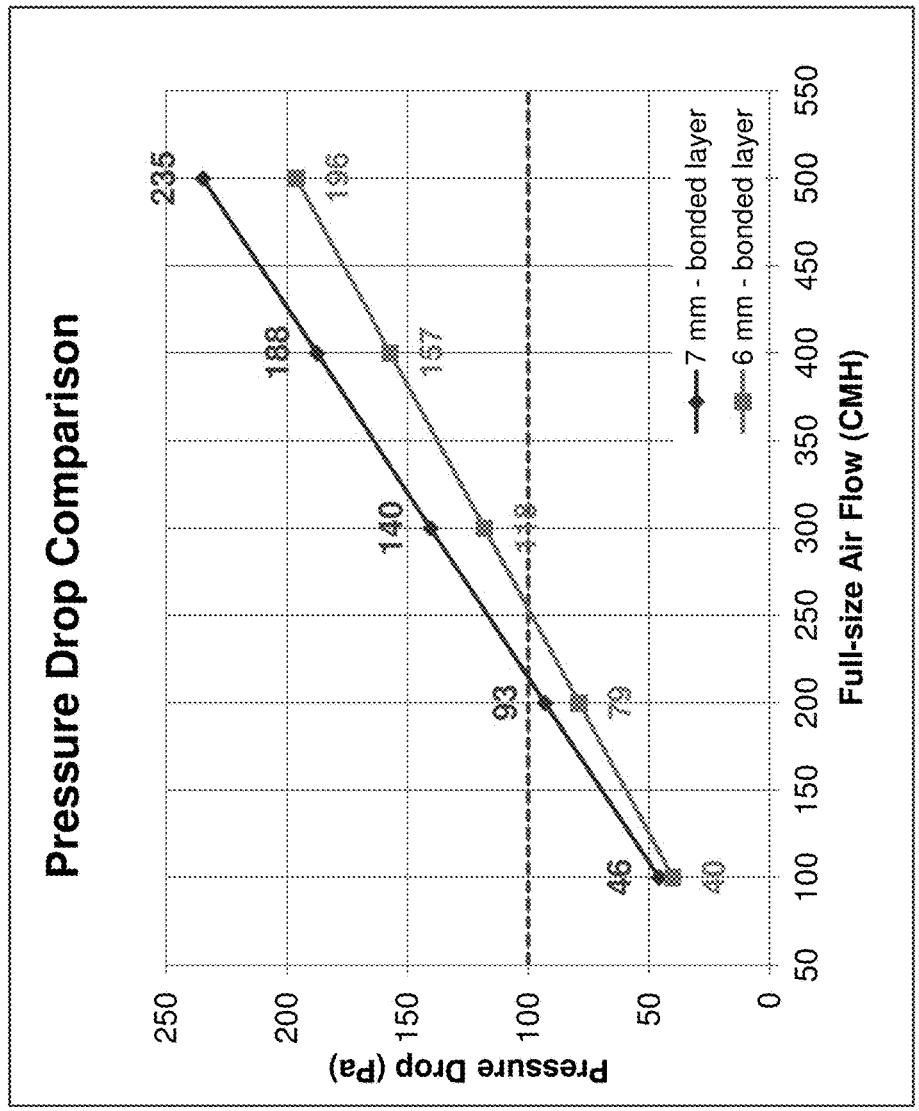
FIG. 6 illustrates the pressure drop of the pleated filter pack in FIG. 3 utilized in the filter construction shown generally in FIG. 1.

FIG. 6 next illustrates the pressure drop of the pleated filter pack of FIG. 3, contemplated for use in the filter construction shown generally in FIG. 1. As can be seen, for the pleated construction where the distance between the apex of the pleats is 7 mm, at 200 cubic meters/hour (CMH), the pressure drop is 93 Pa. For a pleated construction where the distance between the pleat apex is 6 mm, at 200 CMH, the pressure drop is 79 Pa.

Figure 7:
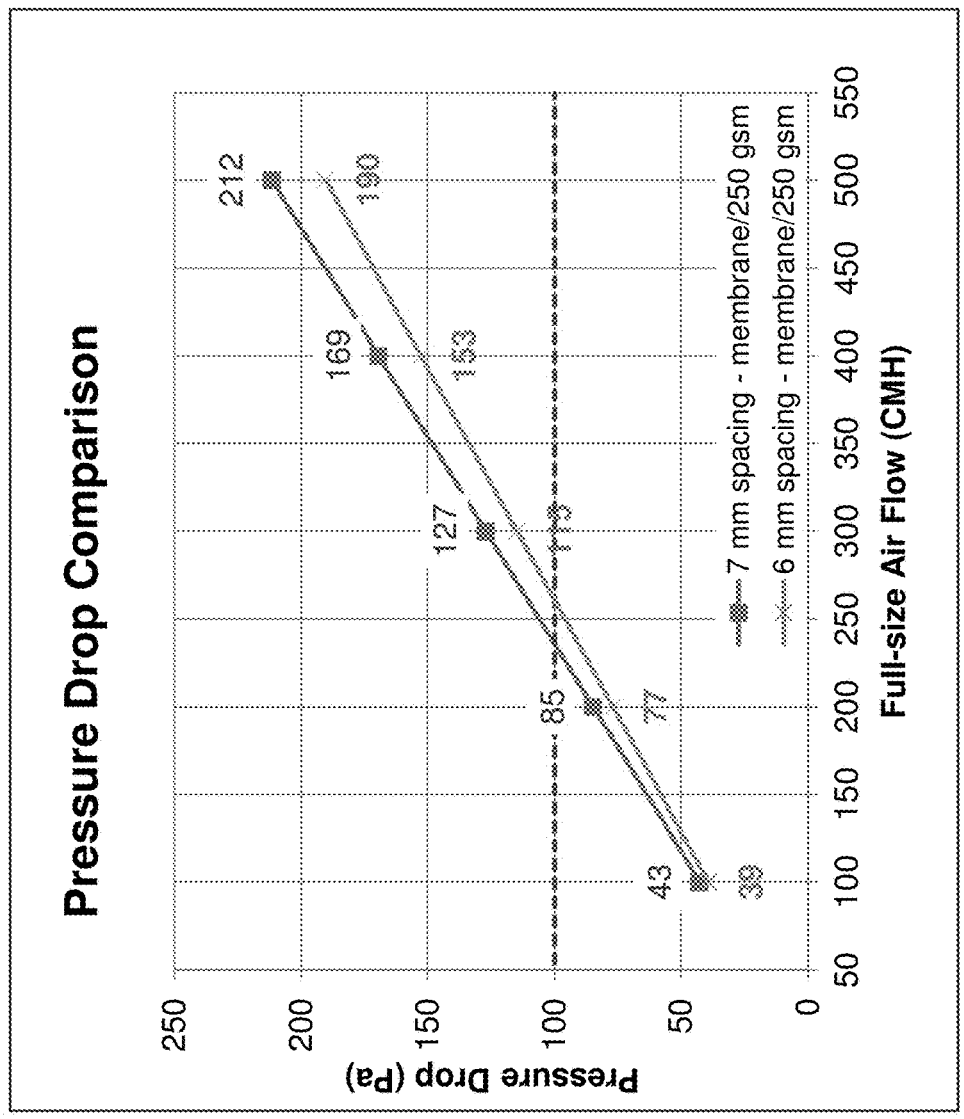
FIG. 7 illustrates the pressure drop of the pleated filter pack in FIG. 3 utilized in the filter construction shown generally in FIG. 1.

FIG. 7 next illustrates the pressure drop of the pleated filter pack of FIG. 3, contemplated for use in the filter construction shown generally in FIG. 1. As can be seen, for the pleated construction where the distance between the apex of the pleats is 7 mm, at 200 cubic meters/hour (CHM), the pressure drop is 85 Pa where the carbon layer is at 250 g/m². For a pleated construction where the distance between the pleat apex is 6 mm, at 200 CMH, the pressure drop is 77 Pa where the carbon layer is at 250 g/m².

Filter performance of a filter made according to the general configuration illustrated in FIG. 3 was next evaluated with regards particle filtration efficiency, pressure drop, capacity, and filtration efficiency with respect to various volatile compounds. The results are presented below for a reference filter having a length of 555 mm, width of 280 mm, height of 30 mm, with a filter area of 1.43 m² and with 92 pleats:

| Flat Sheet Media Test Boundary Conditions - DOE-STD-3020-2005 @ 0.3 µm | | |
|---|---|---|
| Face velocity [m/min] | Filtration Efficiency | Specification @ 1.52 m/min Filtration Efficiency |
| 0.8023 | 99.982% | 99.97% |
| 1.6046 | 99.971% | |

From the above, flat sheet of the aforementioned filter can be seen to provide a 99.982% efficiency of removal of 0.3 µm particles at a face velocity of 0.8023 m/min and a 99.971 efficiency of removal of 0.3 µm particles at a face velocity of 1.6046 m/min, which satisfies the target specification of 99.97% efficiency at a face velocity of 1.52 m/min.

Below is data showing pressure drop of the reference filter according to ISO 11155-1:

| Pressure Drop of Reference Filter according ISO 11155-1 | | |
|---|---|---|
| Air Flow [m³/h] | Specification Pressure Drop [Pa] | Reference filter average n = 5 Pressure Drop [Pa] |
| 100 | ≤60 | 59 |
| 200 | ≤125 | 123 |
| 300 | ≤200 | 190 |
| 400 | ≤230 | 255 |
| 500 | ≤320 | 317 |
| 600 | ≤395 | 389 |

From the above it can be seen that as air flows from 100 m³/h to 600 m³/h, at 100 m³/h increments the reference filter (average of 5 samples) indicated a pressure drop that satisfied the vehicle specification requirements.

Below are the results of testing on the reference filter to determine the capacity of particulate that may be collected:

ISO 12103-175+/−5 mg/m³; 130 m³/h; ISO 11155-1; Face Velocity 1.52 m/min

| Specification Capacity [g/m²] | Capacity dp absolute + 200 Pa [g/m²] | Capacity dp initial + 200 Pa [g/m²] |
|---|---|---|
| | 29 | 68 |

From the above, it can be seen that starting with whatever pressure drop may be present in the filter, when the pressure drop reaches 200 Pa, the capacity of particulate collected is 29 g/m². In addition, when starting with the initial pressure drop, and adding a full 200 Pa of additional pressure drop, the capacity of particulate collected reaches 68 g/m².

Below is a determination of filter efficiency with respect to the identified test aerosol solution of 2% KCl:

| Filtration Efficiency; 2% KCl Aerosol; 200 m³/h-ISO 11155-1 | | 130 m³/h |
|---|---|---|
| Particle Diameter (Mobility Diameter) [nm] | Face velocity 2.31 m/min Filtration Efficiency n =5 dp initial [%] | Face velocity 1.52 m/min Filtration Efficiency n =5 average [%] |
| 10 | | 99.55% |
| 20 | | 99.5% |
| 30 | | 99.5% |
| 40 | | 99.44% |
| 50 | 97.0% | 99.42% |
| 100 | 99.2% | 99.53% |
| 200 | 99.6% | 99.68% |
| 300 | 99.84% | 99.98% |
| 400 | 99.86% | |

From the above it can be seen that in the case of a 2% KCl aerosol at a flow of 200 m³/h, and at a face velocity of 2.31 m/min, 97% to 99.86% of the identified particle diameters were captured by the filter media. At a flow of 130 m³/h 99.55% to 99.98% of the identified particle diameters were captured by the filter media.

Below is an evaluation of the reference filter with respect to adsorption efficiency of the indicated volatile organic compounds:

Adsorption Efficiency—100 m³/h (1.16 m/min)—ISO 11155-2 (2002)

| Time [s] | Toluene 80 ppm Efficiency [%] | Cyclohexane 80 ppm Efficiency [%] | H₂S 10 ppm Efficiency [%] | Ammonia 30 ppm Efficiency [%] | SO₂ 30 ppm Efficiency [%] | Acetaldehyde 30 ppm Efficiency [%] |
|---|---|---|---|---|---|---|
| $C_{60}/C_0$ | 96 | 98 | 98.8 | 48 | 99 | 98 |
| $C_{1200}/C_0$ | 96 | 75 | 88 | | 90 | 28 |
| $C_{7200}/C_0$ | 70 | | | | | |
| Capacity [g] | 56 g | 38 g | 2.3 g | 0.175 | 13 g | 1.4 g |

Efficiency in the above table is defined as the effectiveness of the filter to adsorb gasses. More specifically, $C_0$ is reference to the original concentration and $C_{60}$ is reference to the concentration adsorbed by the filter. Accordingly in the case of toluene, 80 ppm of toluene is introduced at a flow rate of 100 m³/h, and after 60 seconds, the filter was able to adsorb 96% of the toluene. Such adsorption efficiency was the same at 1200 seconds and then at 7200 seconds, dropped to 70%, due to the capacity limitations of the filter (carbon content). A similar analysis applies for the other identified volatile compounds (cyclohexane, H₂S, ammonia, SO₂ and acetaldehyde). As can be seen in the above, the filter herein may collectively and efficiently remove all of these compounds for the vehicle application.

Accordingly, it can be appreciated herein that by providing a filter pack herein, having a surface area for filtration in the range of 2.0 m² to 4.0 m², together with a content of carbon in the range of 500 grams to 800 grams, a remarkably high level of particulate filtration can be achieved, such that the filter is capable of providing a removal efficiency of 99.5% or greater of 0.3 micron particles. In addition, the filter is also one that provides volatile compound filtration which is a general reference of the ability to reduce the incoming levels of one or more of nitrogen dioxide, sulfur dioxide, ozone, toluene, benzene, xylene, hydrogen sulfide, formaldehyde, ammonia and mercaptan, that would otherwise be introduced into the vehicle interior. In addition, the filter pack herein provides such performance under condition where an airflow of 200 CMH indicates a pressure drop of less than or equal to 100 Pa, more preferably in the range of 50 Pa to 100 Pa.

What is claimed is:

1. A vehicular air filter comprising:
    particle filtering media containing a glass fiber backing layer or synthetic fiber backing layer comprising polyesters or polyolefins and having a basis weight of 50 g/m² to 150 g/m² including a polymeric membrane layer comprising a polyethylene, polyamide or fluoropolymer, wherein said particle filtering media provides a removal efficiency of 99.5% or greater of particles having a diameter of 0.3 microns or greater;
    a volatile compound filtration layer affixed to said polymeric membrane layer comprising an activated carbon layer having a basis weight of 180 g/m² to 320 g/m² on a polymeric support layer, wherein said activated carbon layer reduces incoming levels of one or more volatile organic or inorganic compound;
    wherein said vehicle air filter is pleated and provides a surface area for air filtration of 2.0 m² to 4.0 m²; and
    said vehicle air filter has a length in the range of 650 mm to 1100 mm and a width in the range of 300 mm to 400 mm.

2. The vehicular air filter of claim 1 wherein said particle filter media provides a removal efficiency of greater than or equal to 99.5% to 99.96%.

3. The vehicular air filter of claim 1 wherein said particle filter media, at an airflow of 200 cubic meters per hour (CMH), indicates a pressure drop of less than or equal to 100 Pa.

4. The vehicular air filter of claim 3, wherein said pressure drop is in the range of 50 Pa to 100 Pa.

5. The vehicular filter of claim 1 wherein said volatile organic or inorganic compound comprises one or more compounds that has a boiling point of less than or equal to 250° C. measured at atmospheric pressure of 101.3 kPa.

6. The vehicular air filter of claim 1 wherein said volatile organic or inorganic compound comprises at least one of nitrogen oxide (NOx), sulfur dioxide, ozone, cyclohexane, toluene, benzene, xylene, hydrogen sulfide, formaldehyde, ammonia and mercaptan.

7. The vehicular air filter of claim 1 wherein said glass fiber backing layer or synthetic fiber backing layer has a thickness in the range of 0.30 mm to 0.60 mm.

8. The vehicular air filter of claim 1 wherein said glass fiber backing layer or synthetic fiber backing layer comprise fibers having a diameter of 15 μm to 40 μm.

9. The vehicular air filter of claim 1 wherein said polymeric membrane layer has thickness in the range of 100 μm to 150 μm.

10. The vehicular air filter of claim 1 wherein said polymeric membrane layer has a basis weight of 10 g/m² to 30 g/m².

11. The vehicular air filter of claim 1 wherein the thickness of the activated carbon layer together with the polymeric support layer is in the range of 0.75 mm to 2.0 mm.

12. The vehicular air filter of claim 1 wherein said pleats have peaks and wherein the distance between said peaks is in the range of 4.0 mm to 8.0 mm.

* * * * *